(12) United States Patent
Bajpay et al.

(10) Patent No.: US 7,738,640 B1
(45) Date of Patent: *Jun. 15, 2010

(54) METHODS FOR RECONCILING DISCREPANCIES IN CIRCUIT INFORMATION AMONG VARIOUS TELECOMMUNICATION NETWORK MANAGEMENT SYSTEMS

(75) Inventors: Paritosh Bajpay, Edison, NJ (US); Robert Best, Highlands Ranch, CO (US); Hossein Eslambolchi, Los Altos Hills, CA (US); Richard Glozzy, Hackettstown, NJ (US); John McCanuel, Bailey, CO (US); Sheryl Morales, Fanwood, NJ (US); Joanne Penn, Westfield, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 1080 days.

This patent is subject to a terminal disclaimer.

(21) Appl. No.: 11/319,218

(22) Filed: Dec. 28, 2005

(51) Int. Cl.
*H04M 15/00* (2006.01)

(52) U.S. Cl. .............................. 379/114.04; 379/121.05; 379/126

(58) Field of Classification Search ............ 379/114.04, 379/114.14, 121.05, 126, 127.01, 9.02, 9.03, 379/15.03, 114.01, 114.03, 114.29, 133; 455/405–408; 705/52, 75
See application file for complete search history.

(56) References Cited

U.S. PATENT DOCUMENTS

| | | | |
|---|---|---|---|
| 5,687,224 A | 11/1997 | Alley, Jr. et al. | |
| 5,761,432 A | 6/1998 | Bergholm et al. | |
| 5,835,580 A | 11/1998 | Fraser | |
| 5,875,242 A | 2/1999 | Glaser et al. | |
| 6,134,560 A | 10/2000 | Kliebhan | |
| 6,169,793 B1 | 1/2001 | Godwin et al. | |
| 6,295,540 B1 | 9/2001 | Sanschagrin et al. | |
| 6,385,444 B1 * | 5/2002 | Peschel et al. | 455/405 |
| 6,493,727 B1 | 12/2002 | Huang et al. | |
| 6,636,877 B1 | 10/2003 | Doleac et al. | |
| 6,662,015 B2 | 12/2003 | Furlong | |
| 6,678,370 B1 | 1/2004 | Freebersyser et al. | |
| 6,771,758 B1 | 8/2004 | Sandel et al. | |
| 6,820,088 B1 | 11/2004 | Hind et al. | |
| 6,877,008 B1 | 4/2005 | Kirkpatrick et al. | |
| 6,891,937 B1 | 5/2005 | Kuhn et al. | |
| 6,891,938 B1 * | 5/2005 | Scott et al. | 379/112.06 |
| 6,944,657 B1 | 9/2005 | Taghadoss | |
| 7,085,360 B1 * | 8/2006 | Sprouse | 379/114.04 |
| 7,263,533 B2 | 8/2007 | Bauer et al. | |
| 2003/0133436 A1 | 7/2003 | Patel et al. | |
| 2005/0031103 A1 * | 2/2005 | Gunderman | 379/114.03 |
| 2005/0068950 A1 | 3/2005 | Ellis et al. | |
| 2005/0169260 A1 | 8/2005 | Andrews et al. | |
| 2005/0216380 A1 | 9/2005 | Morris et al. | |
| 2006/0045251 A1 * | 3/2006 | Liu et al. | 379/127.01 |

* cited by examiner

*Primary Examiner*—Quoc D Tran (57) ABSTRACT

A method includes retrieving a first data set from a billing system configured to facilitate a billing operation associated with a network. The first data set includes a plurality of billing records, which includes a first billing record associated with and including a field identifying a first circuit from a plurality of circuits included within the network. A second data set is retrieved from a configuration management system configured to facilitate an operation associated with the network. The second data set includes a plurality of configuration records, which includes a first configuration record associated with and including a field identifying the first circuit. When the field identifying the first circuit included in the first configuration record differs from the field identifying the first circuit included in the first billing record, a correct identifier associated with the first circuit is determined. When such a discrepancy exists, a report is produced.

9 Claims, 5 Drawing Sheets

METHODS FOR RECONCILING DISCREPANCIES IN CIRCUIT INFORMATION AMONG VARIOUS TELECOMMUNICATION NETWORK MANAGEMENT SYSTEMS

CROSS-REFERENCE TO RELATED APPLICATIONS

This application is related to U.S. patent application Ser. No. 11/319,181, entitled "Methods for Reconciling Trunk Group Identification Information Among Various Telecommunication Network Management Systems," filed on even date herewith, which is incorporated herein by reference in its entirety.

BACKGROUND

The invention relates generally to communication networks and methods, and more particularly to methods and systems for reconciling discrepancies in circuit information among various telecommunication network management systems.

Telecommunications service providers use many different types of network circuits to provide a variety of telecommunication services. Such services can include, for example, providing dedicated circuits within the Plain Old Telephone Service ("POTS") network and providing access to an internet protocol ("IP") network. When an end user requires such service, a connection from the end user's equipment to a network must be established. This often involves designing an appropriate circuit to establish a path from the customer site to the edge nodes of a network, assigning available network facilities for use in building the circuit, and connecting or establishing the designed circuit.

In some instances, establishing service in this manner involves multiple service providers. For example, an end user may contract with an inter-exchange carrier ("IXC") to provide a network service, such as "800 service" for a given end user location. The inter-exchange carrier ("IXC") may in turn contract with one or more local exchange carriers ("LECs") to provide one or more dedicated circuits to connect the end user's equipment to an edge node within the IXC's core network. In other instances, however, an IXC may opt to provide one or more circuits to directly connect the end user's equipment to an edge node within the core network. Such direct circuits are often used when the end user is a large customer requiring a high volume of circuits.

Service providers employ various known management systems to facilitate establishing and/or allocating circuits to connect an end user's equipment to an edge node within a network. For example, an ordering database can include the details about the end user's service request, such as the bandwidth desired, the point of origination, and the point of destination. An inventory database can include a listing of the edge nodes and circuits that are available for connecting the end user's equipment to the network. In cases when a circuit is provided by a LEC, an interface system can be used to request a circuit from a LEC. A provisioning system can be used to establish a circuit by making the necessary software connections, thereby assigning the circuit to the end user. Finally, a billing system can be used to facilitate the billing activity associated with a circuit.

Some known network management systems employ information characterizing the circuits connecting an end user's equipment to an edge node to carry out their desired functions. Such information can include, for example, the end user associated with a circuit, the beginning and end locations associated with a circuit, and/or a common language code that identifies a circuit. In some instances, the circuit information is maintained in a central database, which is accessed by the various network management systems. In other instances, however, known network management systems do not share common data, but rather individually maintain records containing the circuit information. For example, some known billing systems maintain a database of records identifying the billing characteristics for a group of circuits while some known provisioning systems maintain a database of records identifying the facilities included within the same group of circuits.

In network management systems that maintain individual databases, discrepancies can exist between the information included therein. Such discrepancies can be caused by errors in the data input process, errors in transmitting data from one network management system to another, and the like. Known network management systems do not periodically review the status of information contained within the various network management systems to ensure that information associated with circuits within a network is consistent between the various network management systems. Thus, a need exists for methods and systems for reconciling discrepancies in circuit information among various telecommunication network management systems.

SUMMARY

A method includes retrieving a first data set from a billing system configured to facilitate a billing operation associated with a network. The first data set includes a set of billing records, which includes a first billing record associated with and including a field identifying a first circuit from a set of circuits included within the network. A second data set is retrieved from a configuration management system configured to facilitate an operation associated with the network. The second data set includes a set of configuration records, which includes a first configuration record associated with and including a field identifying the first circuit. When the field identifying the first circuit included in the first configuration record differs from the field identifying the first circuit included in the first billing record, a correct identifier associated with the first circuit is determined. When such a discrepancy exists, a report is produced.

DETAILED DESCRIPTION

A method includes retrieving a first data set from a billing system configured to facilitate a billing operation associated with a network. The first data set includes a set of billing records, which includes a first billing record associated with and including a field identifying a first circuit from a set of circuits included within the network. A second data set is retrieved from a configuration management system configured to facilitate an operation associated with the network. The second data set includes a set of configuration records, which includes a first configuration record associated with and including a field identifying the first circuit. When the field identifying the first circuit included in the first configuration record differs from the field identifying the first circuit included in the first billing record, a correct identifier associated with the first circuit is determined. When such a discrepancy exists, a report is produced.

In some embodiments, when the field included in the first billing record includes an incorrect identifier associated with the first circuit, the method includes updating the field included in the first billing record to include the correct identifier. Similarly, when the field included in the first configuration record includes an incorrect identifier associated with the first circuit, the field included in the first configuration record is updated to include the correct identifier.

In some embodiments, a method includes retrieving a first data set from a billing system configured to facilitate a billing operation associated with a network. The first data set includes a set of billing records, each of which is associated with a circuit from a set of circuits included within the network. Among the billing records from the first data set is a first billing record associated with a first circuit from the set of circuits. A second data set is retrieved from a configuration management system configured to facilitate an operation associated with the network. The second data set includes a set of configuration records, each of which is associated with a circuit from the plurality of circuits. When the set of configuration records does not include a configuration record associated with the first circuit, it is then determined whether the first billing record is associated with a legitimate order for service. When the first billing record is associated with the legitimate order for service, a provisioning instruction is issued.

In some embodiments, a method includes retrieving a first data set from a billing system configured to facilitate a billing operation associated with a network. The first data set includes a set of billing records, each of which is associated with a circuit from a set of circuits included within the network. A second data set is retrieved from a configuration management system configured to facilitate an operation associated with the network. The second data set includes a set of configuration records, each of which is associated with a circuit from the set of circuits. Among the set of configuration records is a first configuration record associated with a first circuit from the set of circuits. When the set of billing records does not include a billing record associated with the first circuit, a test instruction is issued to test a portion of the network associated with the first circuit. Data is then received in response to the test instruction. When the datum indicates that the first circuit is not operational, a disconnect instruction is issued to disconnect the first circuit.

The term "circuit" or "network circuit" is used herein to mean a communication path between two or more nodes that is established by interconnecting a set of network facilities. A circuit can be physical in nature, including items such as the transmission lines, switches and/or other physical network facilities that are connected to establish a communication path between network nodes. As such, a circuit can be connected by physically making the necessary hardware connections to establish the circuit. Alternatively, a circuit can be virtual in nature, including items such as software identifiers associated with facilities, the software identifiers being allocated to establish a communication path between network nodes. Therefore, a circuit also can be connected by allocating the necessary facilities within a network configuration management system, such as a provisioning system, to establish a circuit.

Figure 1:
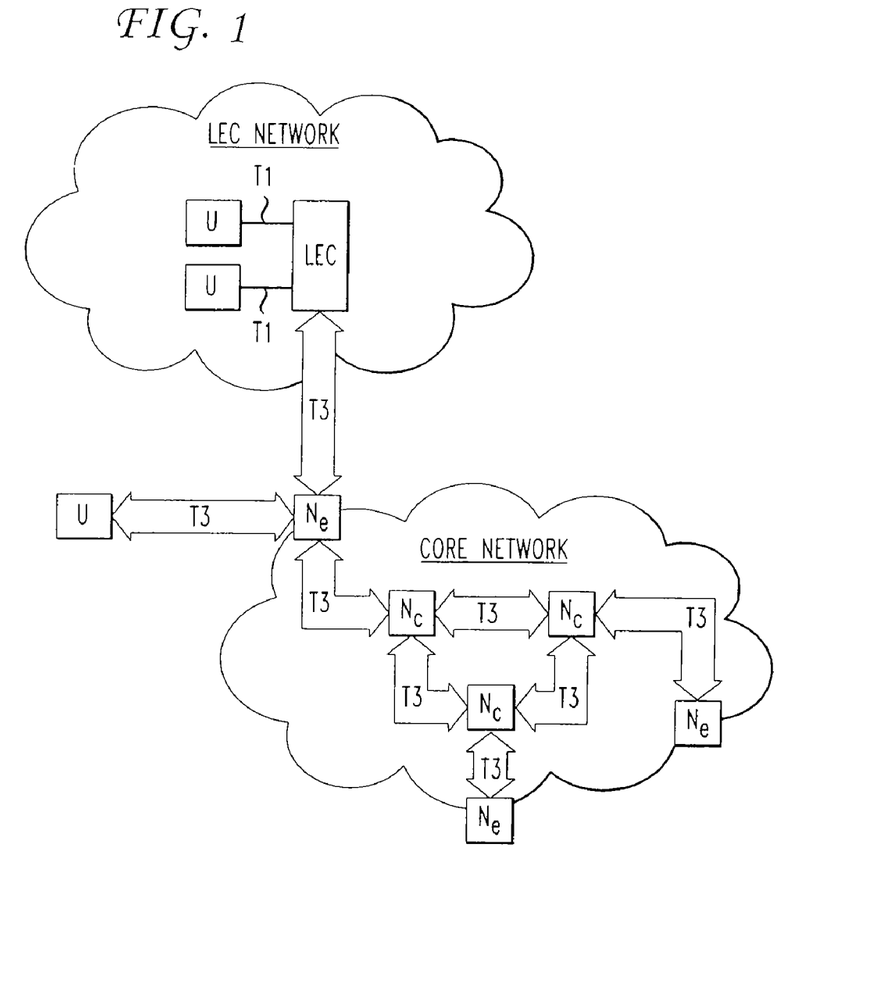
FIG. 1 is a schematic illustration of various circuits residing within and between a core network and an end user.

FIG. 1 is a schematic illustration of various facilities and circuits included within and providing access to a core network, such as a network managed by an inter-exchange carrier ("IXC"). As illustrated, the core network includes a series of edge nodes, labeled as $N_e$, and core nodes, labeled as $N_c$. The edge nodes $N_e$ can be, for example, edge switches that provide a point of user access to the core network. Similarly, the core nodes $N_c$ can be core switches that reside wholly within a core network that interconnect the edge switches. As illustrated, the edge nodes $N_e$ and the core nodes $N_c$, are interconnected by a series of transmission lines T3, which can be, for example, high-bandwidth T3 trunk lines. Although each pair of edge nodes $N_e$ and core nodes $N_e$ is illustrated as being interconnected by a single transmission line T3, in reality the nodes are interconnected by many transmission lines. A grouping of transmission lines having similar properties, such as the beginning and end destinations, is often referred to as a trunk group. Network circuits can be established within the core network by interconnecting the nodes and transmission lines, thereby providing an efficient means of transporting communication signals across long distances.

As illustrated in FIG. 1, an end user U can gain access to the core network either directly or via a LEC network. As illustrated, when gaining access via a LEC network, the end user's equipment U is connected to a LEC office by a transmission line T1, which can be, for example a T1 trunk line. The LEC office, in turn, provides a connection to an edge node $N_e$ within the core network via a transmission line T3, which can include the signals from multiple end users U. In this manner, a circuit, often referred to as a "local loop," is established through which the end user U can access the core network.

When gaining access to the core network directly, the end user's equipment U is connected directly to an edge node $N_e$ within the core network. As illustrated, the connection can be made via a transmission line T3, which can be, for example, a high bandwidth T3 trunk line. In other instances, depending on the needs of the end user U, the direct connection can be made via an entire trunk group. In this manner, a "direct connect" circuit is established through which the end user U can access the core network. Direct connect circuits are often used when the end user is a large customer requiring a high volume of circuits.

As discussed above, a service provider can employ a variety of network management systems to ensure that local loop and direct connect circuits are efficiently used and are generating revenue. Such network management systems often employ information characterizing such circuits to carry out their desired functions. The effectiveness of the network management systems is diminished when discrepancies exist in the data maintained by different network management system. For example, when a billing system contains a circuit identifier that does not match with a circuit identifier contained in another network management system, the resulting bill may be incorrect. Similarly, in some cases a circuit existing in a provisioning system will not have any corresponding records in a billing system, thereby resulting in a circuit for which no bill is generated.

Figure 2:
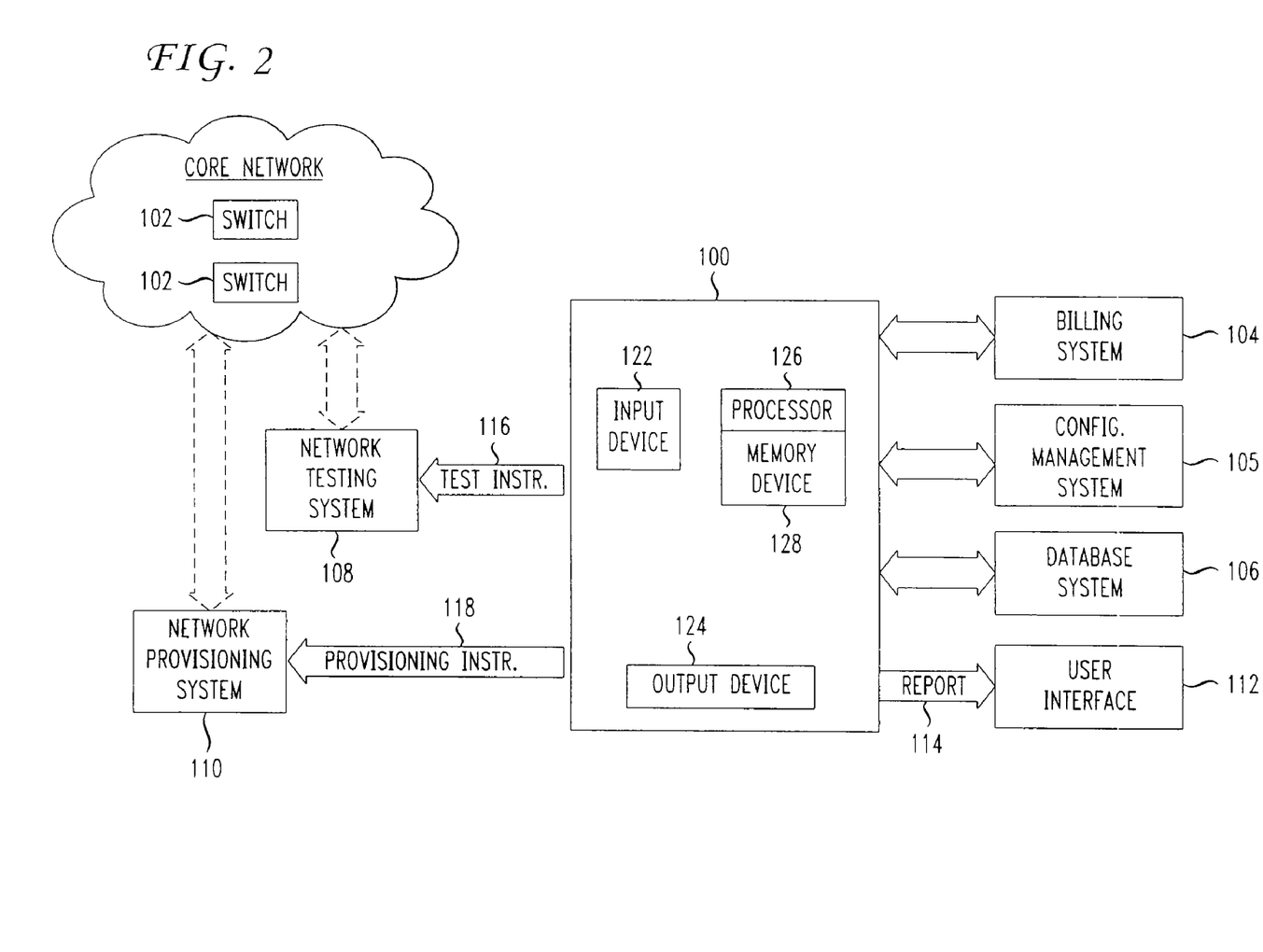
FIG. 2 is a schematic illustrating a system for reconciling discrepancies in circuit information among various telecommunication network management systems according to an embodiment of the invention.

FIG. 2 is a schematic illustration of an information reconciliation system 100 for reconciling discrepancies in circuit information among various telecommunication network management systems according to an embodiment of the invention. The information reconciliation system 100 includes a processor 126 and a memory device 128. The illustrated information reconciliation system 100 also includes an input device 122 configured to receive input from an external source, such as billing system 104 or a database system 106, as described below. Similarly, the information reconciliation system 100 includes an output device 124 configured to provide output to an external device, such as a network testing system 108 or a network provisioning system 110, as described below.

The information reconciliation system 100 is configured to receive a first data set from a billing system 104. The first data set includes a set of billing records, each of which is associated with and includes a field containing a circuit identifier to uniquely identify a circuit within a core network. The circuit identifier can include, for example, a common language code for uniquely identifying each circuit. Such codes can include a common language circuit code (CLCI™ code), a common language facility code (CLFI™ code), a common language location code (CLLI™ code), and/or a combination of the above. In addition to the field containing the circuit identifier, each of the billing records can include additional fields containing information characterizing the circuit. Such information can include, for example, the end user associated with a circuit, the beginning and end locations associated with a circuit, and/or a billing rate associated with the circuit.

In some embodiments, the information reconciliation system 100 receives the first data set automatically. For example, the information reconciliation system 100 can be configured to automatically download a first data set from a billing system 104 at various predetermined times. Alternatively, the information reconciliation system 100 can be configured to issue an instruction to a billing system 104 to receive the first data set when prompted by a user via a user interface 112.

To ensure that the first data set is of a manageable size, in some embodiments, the information reconciliation system 100 is configured to select a candidate set of circuits for which billing records are to be received from the billing system 104. A candidate set of circuits can include, for example, all direct connect circuits originating from a particular switch 102 within a core network. In some embodiments, a user can specify the criteria for defining a candidate set of circuits via a user interface 112. In this manner, the information reconciliation system 100 can reconcile discrepancies in circuit information between a billing system 104 and other network management systems, such as a configuration management system 105, in discrete portions.

Upon receiving the first data set, the information reconciliation system 100 then receives a second data set from a configuration management system 105. The configuration management system 105 can include a variety of different systems configured to facilitate an operation associated with the network. For example, the configuration management system 105 can be a centralized database system for maintaining network topology information.

The second data set includes a set of configuration records, each of which is associated with and includes a field containing a circuit identifier to identify a circuit within the core network. As described above, the circuit identifier can include a common language code for uniquely identifying each circuit. Each of the configuration records can include additional fields containing information characterizing the circuit. Such information can be the same as or different from the information contained in the billing records. Information included in the configuration records can include, for example, a listing of the network facilities included within a circuit, the bandwidth associated with a circuit, and/or the beginning and end locations associated with a circuit.

In some embodiments, the information reconciliation system 100 receives the second data set automatically. For example, the information reconciliation system 100 can be configured to automatically download a second data set associated with the same candidate set of circuits for which the first data set was received. In this manner, the first data set and second data sets are associated with the same candidate set of circuits. In other embodiments, the information reconciliation system 100 is configured to require input from a user via a user interface 112 prior to receiving the second data set.

Upon receiving both the first data set and the second data set, the information reconciliation system 100 compares the two data sets to determine whether a discrepancy exists between the circuit identifier included in a billing record associated with a circuit and the circuit identifier included in a configuration record associated with the same circuit. In some embodiments, the information reconciliation system 100 employs a rules-based algorithm to identify such "mismatch-type" discrepancies, and ensure that the identified billing record and the identified configuration record are associated with the same circuit. For example, the information reconciliation system 100 can determine that a mismatch-type discrepancy exists if a specific number of predetermined criteria are met. Such criteria can include whether a portion of the circuit identifier from a billing record matches a portion of the circuit identifier from a configuration record, whether a record date associated with a billing record matches or is close to a record date associated with a configuration record, and/or the whether the number of fields within a billing record that match the corresponding fields within a configuration record exceeds a predetermined threshold.

When a mismatch-type discrepancy is identified, the information reconciliation system 100 determines the correct circuit identifier. In such a situation, three possibilities exist: the billing record can include the correct circuit identifier, the configuration record can include the correct circuit identifier, or neither the billing record nor the configuration record include the correct circuit identifier. In some embodiments, the information reconciliation system 100 employs a rules-based algorithm to determine automatically which of the three possibilities exists and to determine automatically the correct circuit identifier. The processing rules can include, for example, giving greater weight to the circuit identifier included within the billing record, giving greater weight to the circuit identifier in the record that was most recently updated, and/or giving greater weight to the circuit identifier that more closely matches the remaining fields included in either the billing record or the configuration record. In other embodiments, the information reconciliation system 100 issues requests to and receives data from one or more database systems 106 to determine the correct circuit identifier. For example, the information reconciliation system 100 can be configured to give greater weight to the circuit identifier that matches all or a portion of a circuit identifier from a database system 106, such as an ordering system.

Upon determining the correct circuit identifier, the information reconciliation system 100 produces a report 114. The report can be produced in a variety of different formats, such as ASCII format, binary format, or as a data file attached to an e-mail. As illustrated, the report is transmitted to a user interface 112. In this manner, the information reconciliation system 100 notifies a user (not shown in FIG. 2) that a discrepancy exists. In some embodiments, the information reconciliation system 100 updates the erroneous record in either the first data set or the second data set or both with the correct circuit identifier.

In addition to determining whether mismatch-type discrepancies exist, the information reconciliation system 100 also compares the two data sets to determine whether the first data set contains a billing record associated with a circuit for which no configuration record exists in the second data set, and vice-versa. Such "missing record-type" discrepancies can occur, for example when an order for service is partially processed or when errors occur in transmitting data between various network management systems. For example, when an end user initiates an order for service and very soon thereafter cancels the order, it is possible that a billing record will be created for a circuit for which no configuration record exists. Similarly, an error data transmission may result in the improper removal of a billing record while the corresponding configuration record remains resident within a configuration management system. In some embodiments, the information reconciliation system 100 employs a rules-based algorithm to identify such missing record-type discrepancies, in a similar manner as discussed above.

In instances when a billing record exists without a corresponding configuration record, the information reconciliation system 100 determines whether the billing record is associated with a legitimate order for service. In some embodiments, the information reconciliation system 100 issues one or more instructions to a database system 106, such as an ordering system to determine whether the billing record is associated with a legitimate order. When a billing record is determined to be associated with a legitimate order for service, the information reconciliation system 100 issues a provisioning instruction 118 to a network provisioning system 110 to establish the circuit associated with the billing record. In this manner, the information reconciliation system 100 facilitates completion of orders that have otherwise been "hung up" in the provisioning process. When, however, a billing record is determined not to be associated with a legitimate order for service, the information reconciliation system 100 updates the first data set to remove the billing record. In some embodiments, the information reconciliation system 100 then produces a report 114, as discussed above.

In instances when a configuration record exists without a corresponding billing record, the information reconciliation system 100 determines whether the circuit identified in the configuration record is operational and in use. In the illustrated embodiment, the information reconciliation system 100 makes this determination by issuing a test instruction 116 to a network testing system 108 to conduct a test of a portion of the network that includes the circuit. The information reconciliation system 100 then receives and analyzes the data returned by the network testing system 108 to determine the status of the circuit.

When the circuit identified in the configuration record is operational, the information reconciliation system 100 establishes a billing record associated with the circuit. In some embodiments, the information reconciliation system 100 establishes a billing record by updating the first data set add a billing record. In other embodiments, the information reconciliation system 100 issues an instruction to the billing system 104 to establish the appropriate billing record. In this manner, the information reconciliation system 100 ensures that a billing record is established for all operational circuits. When a configuration record is associated with a circuit that is not operational, however, the information reconciliation system 100 can be configured to issue a provisioning instruction 118 to a network provisioning system 110 to disconnect the circuit, thereby returning the associated facilities to an inventory system (not shown in FIG. 2) and removing the configuration record from the second data set.

The illustrated information reconciliation system 100 includes a processor 126 and a memory device 128. The processor 126 can be a commercially-available processing device configured to perform one or more specific tasks. For example, the processor 126 can be a commercially-available microprocessor. Alternatively, the processor 126 can be an application-specific integrated circuit (ASIC) or a combination of ASICs, which are designed to perform one or more specific functions. In yet other embodiments, the processor 126 can be an analog or digital circuit, or a combination of multiple circuits.

The memory device 128 can include one or more types of memory. For example, the memory device 128 can include a read only memory (ROM) component and a random access memory (RAM) component. The memory device 128 can also include other types of memory suitable for storing data in a form retrievable by the processor 126, for example, electronically programmable read only memory (EPROM), erasable electronically programmable read only memory (EEPROM), or flash memory.

Although the information reconciliation system 100 is illustrated and described as including a processor 126, a memory device 128, an input device 122 and an output device 124, in some embodiments, the system can include software in the form of processor-readable code instructing a processor to perform the functions described herein. In other embodiments, the information reconciliation system 100 can include firmware that performs the functions described herein.

The operations performed by the information reconciliation system 100 can be done either automatically or manually. An operation is done automatically when it is done without human intervention. For example, in some embodiments, the information reconciliation system 100 determines automatically the correct circuit identifier when a mismatch-type discrepancy is identified, by using a rules-based algorithm as described above. In other embodiments, however, the information reconciliation system 100 may require input from a user, such as selecting a set of rules, to determine the correct circuit identifier.

Although the information reconciliation system 100, the billing system 104 and the configuration management system 105 are shown and described above as being separate systems, in some embodiments, the functions of the information reconciliation system 100 can be incorporated into the billing system 104. In other embodiments, the functions of the information reconciliation system 100 can be incorporated into the configuration management system 105. In yet other embodiments, certain functions of the information reconciliation system 100 can be incorporated into the billing system 104, while certain other functions of the information reconciliation system 100 can be incorporated into the configuration management system 105.

Figure 3:
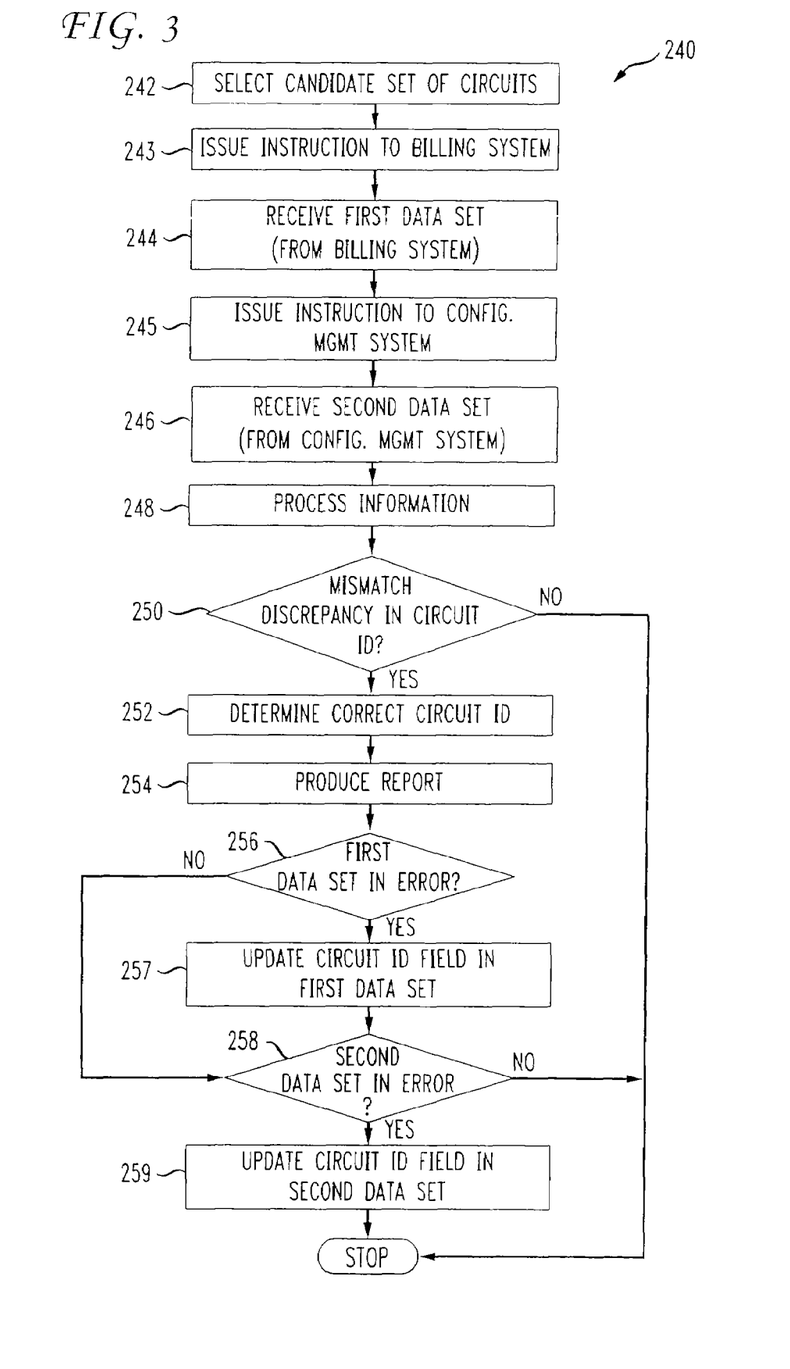
FIG. 3 is a flow chart illustrating a method for reconciling discrepancies in circuit information among various telecommunication network management systems according to an embodiment of the invention.

FIG. 3 is a flow chart illustrating a method 240 for reconciling mismatch-type discrepancies in circuit information between a billing system and a configuration management system according to an embodiment of the invention. The illustrated method includes selecting a candidate set of circuits to be analyzed according to the operations presented herein, 242. In some embodiments, the candidate set of circuits includes all direct connect circuits originating from a particular switch within a core network. In other embodiments, the candidate set of circuits includes those circuits assigned to a particular end user.

Once candidate set of circuits has been selected, the method includes issuing an instruction to retrieve a first data set from a billing system, 243. Such an instruction can be in the form of a query to retrieve specific data from the billing system. In some embodiments, the method includes issuing a single instruction to a billing system. In other embodiments, the method includes issuing multiple instructions to a billing system. In yet other embodiments, the first data set is received automatically from the billing system without requiring that an instruction be issued.

The illustrated method then includes receiving a first data set from a billing system, 244. As discussed above, the first data set includes a set of billing records, each of which is associated with and includes a field containing a circuit identifier to uniquely identify a circuit within a core network. Additionally, each of the billing records can include additional fields containing information characterizing the circuit. Such information can include, for example, the end user associated with a circuit, the beginning and end locations associated with a circuit, and/or a billing rate associated with the circuit.

In a similar fashion, the illustrated method includes issuing an instruction to retrieve a second data set from a configuration management system, 245, and receiving the second data set, 246. The second data set includes a set of configuration records, each of which is associated with and includes a field containing a circuit identifier to identify a circuit within the core network, as described above. Each of the configuration records can also include additional fields containing information characterizing the circuit. Such information can be the same as or different from the information contained in the billing records. In some embodiments, the second data set is received automatically from the billing system without requiring that an instruction be issued.

Both the first and second data sets can be received in a variety of different formats. In some embodiments, the data sets are received in ASCII format. In other embodiments, the data sets are received in binary or any other machine-readable format.

Upon receiving the first and second data sets, the illustrated method includes processing the information therein, 248, and determining whether a discrepancy exists between the circuit identifier included in a billing record associated with a circuit and the circuit identifier included in a configuration record associated with the same circuit, 250. As discussed above, in some embodiments, determining whether a mismatch-type discrepancy exists is accomplished automatically using a rules-based algorithm.

When a mismatch-type discrepancy is discovered, the illustrated method includes determining the correct circuit identifier, 252. In some embodiments, the correct circuit identifier is determined automatically using a rules-based algorithm, as discussed above. The method then includes producing a report, 254. In some embodiments, the report can be transmitted to a user interface, thereby notifying a user of the identified mismatch-type discrepancy. In other embodiments, the report can be in the form of an e-mail and/or an audible page to notify a user of the identified mismatch-type discrepancy. In yet other embodiments, the operation of producing a report is not required for the successful completion of the illustrated method.

Once the correct circuit identifier has been determined, the illustrated method includes determining whether the billing record includes an erroneous circuit identifier, 256, and, if so, updating the first data set to include the correct circuit identifier, 257. Similarly, the illustrated method includes determining whether the configuration record includes an erroneous circuit identifier, 258, and, if so, updating the second data set to include the correct circuit identifier, 259. In some embodiments, the billing record is updated by directly changing the first data set received in operation 243 and transmitting the data set to the billing system. In other embodiments, the billing record is updated by issuing an instruction to the billing system to modify the database resident in the billing system. Similarly, the configuration record can be updated in a like fashion.

Figure 4A:
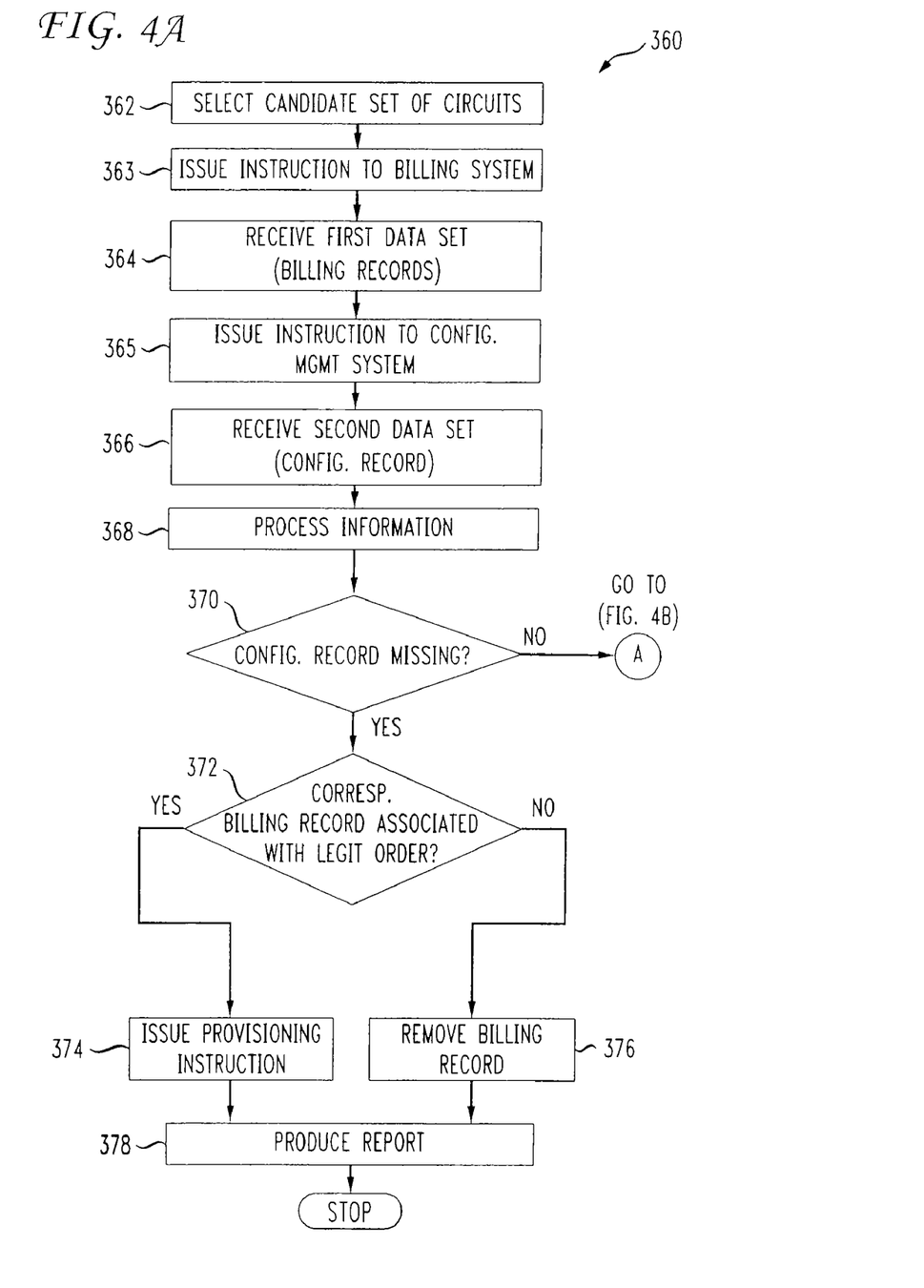
FIGS. 4A and 4B include a flow chart illustrating a method for reconciling discrepancies in circuit information among various telecommunication network management systems according to an embodiment of the invention.
Figure 4B:
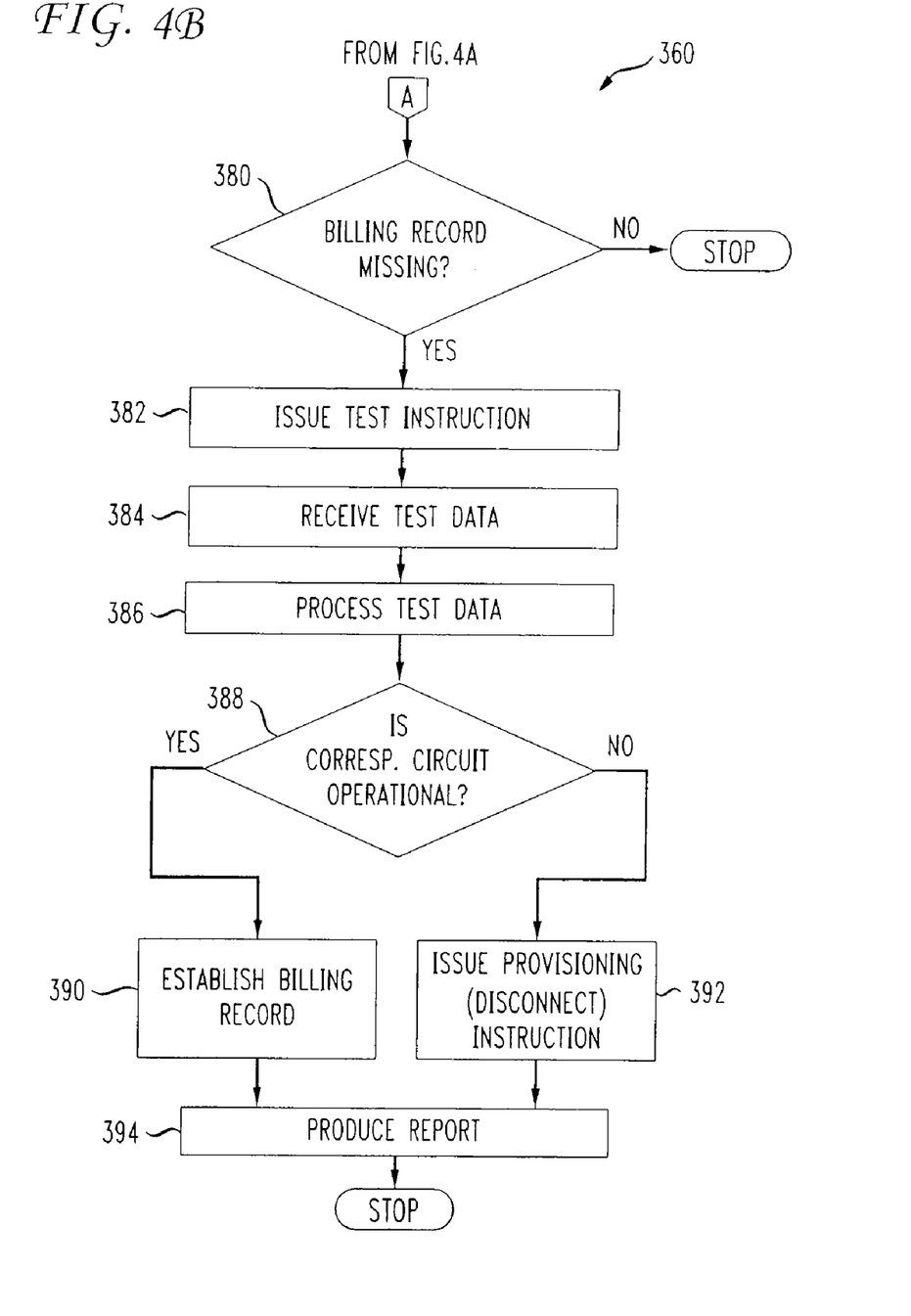

FIGS. 4A and 4B include a flow chart illustrating a method 360 for reconciling missing record type discrepancies in circuit information between a billing system and a configuration management system according to an embodiment of the invention. The illustrated method includes many operations that are similar or analogous to those discussed above in reference to the method 240. The illustrated method includes selecting a candidate set of circuits to be analyzed, 362. As described above, once the candidate set of circuits has been selected, the method includes issuing an instruction to retrieve a first data set from a billing system, 363, and receiving a first data set in a format as described above, 364. Similarly, the illustrated method includes issuing an instruction to retrieve a second data set from a configuration management system, 365, and receiving the second data set in a format as described above, 366. In some embodiments, the first data set, the second data set, or both can be received automatically from without requiring that an instruction be issued.

Upon receiving the first and second data sets, the illustrated method includes processing the information therein, 368, and determining whether the first data set contains a billing record associated with a circuit for which no configuration record exists in the second data set, 370. As discussed above, this determination can be made using a rules-based algorithm. When a billing record exists without a corresponding configuration record, the illustrated method includes determining whether the billing record is associated with a legitimate order for service, 372, as discussed above. When a billing record is determined to be associated with a legitimate order for service, the illustrated method includes issuing a provisioning instruction, as discussed above, to establish the circuit associated with the billing record, 374. In this manner, the illustrated method facilitates completion of orders that have otherwise been "hung up" in the provisioning process. When, however, a billing record is determined not to be associated with a legitimate order for service, the illustrated method includes updating the first data set to remove the billing record, 376. The illustrated method then includes producing a report, 378, of the type discussed above. In other embodiments, the operation of producing a report is not required for the successful completion of the illustrated method.

When it is determined that each billing record within the first data set corresponds to a configuration record within the second data set, the illustrated method includes determining whether the second data set contains a configuration record associated with a circuit for which no billing record exists in the first data set, 380 (see FIG. 4B). When a configuration record exists without a corresponding billing record, the illustrated method includes issuing a test instruction to conduct a test of a portion of the network that includes the circuit, 382. In some embodiments, the test instruction can be a request to a network testing system to send a test message along the circuit to ascertain the status of the circuit. In other embodiments, the operation can include issuing a set of test instructions to one or more network testing systems.

The illustrated method then includes receiving data in response to the test instruction, 384, processing the received data, 386, and determining, based on the received data, whether the circuit for which no billing record exists is operational.

When the circuit is determined to be operational, the illustrated method includes establishing a billing record associated with the circuit, 390. As discussed above, in some embodiments this operation includes updating the first data set to add a billing record. In other embodiments, this operation includes issuing an instruction to a billing system to establish the appropriate billing record.

When a configuration record is associated with a circuit that is not operational, however, the circuit can be described as a "stranded" circuit. A stranded circuit is a circuit that is no longer in use but that remains connected within the configuration management system, thereby making the circuit and the facilities included therein unavailable for reuse to fulfill other service orders. Because stranded circuits remain unavailable for reuse, they are an inefficient use of network assets. To recapture the assets, the illustrated method includes issuing a provisioning instruction to disconnect the circuit, 392, thereby returning the associated facilities to an inventory system and removing the configuration record from the second data set. In some embodiments, the provisioning instruction is issued to a network provisioning system. In other embodiments, a method includes issuing a set of provisioning instructions to one or more provisioning systems.

CONCLUSION

While various embodiments of the invention have been described above, it should be understood that they have been presented by way of example only, and not limitation. For example although the above methods are shown and described above as a series of operations occurring in a particular order, in some embodiments, certain operations can be completed in a parallel fashion. In other embodiments, the operations can be completed in an order that is different from that shown and described above.

What is claimed is:

1. A method, comprising:
retrieving a first data set from a billing system configured to facilitate a billing operation associated with a network, the first data set including a plurality of billing records, the plurality of billing records including a first billing record associated with and including a field identifying a first circuit from a plurality of circuits included within the network;
retrieving a second data set from a configuration management system configured to facilitate an operation associated with the network, the second data set including a plurality of configuration records, the plurality of configuration records including a first configuration record associated with and including a field identifying the first circuit;
determining, via a processor, a correct identifier associated with the first circuit when the field included in the first configuration record differs from the field included in the first billing record;
producing a report when the field included in the first configuration record differs from the field included in the first billing record;
updating the field included in the first billing record to include the correct identifier associated with the first circuit when the field included in the first billing record includes an incorrect identifier associated with the first circuit; and
updating the field included in the first configuration record to include the correct identifier associated with the first circuit when the field included in the first configuration record includes an incorrect identifier associated with the first circuit.

2. A method, comprising:
retrieving a first data set from a billing system configured to facilitate a billing operation associated with a network, the first data set including a plurality of billing records, each billing record from the plurality of billing records being associated with a circuit from a plurality of circuits included within the network, the plurality of billing records including a first billing record associated with a first circuit from the plurality of circuits;
retrieving a second data set from a configuration management system configured to facilitate an operation associated with the network, the second data set including a plurality of configuration records, each configuration record from the plurality of configuration records being associated with a circuit from the plurality of circuits, wherein the plurality of configuration records includes a first configuration record associated with a second circuit from the plurality of circuits;
determining, via a processor, whether the first billing record is associated with a legitimate order for service when the second data set does not include a configuration record from the plurality of configuration records that is associated with the first circuit;
issuing a provisioning instruction when the first billing record is associated with the legitimate order for service;
issuing a test instruction to test a portion of the network associated with the second circuit when the first data set does not include a billing record from the plurality of billing records that is associated with the second circuit;
receiving a datum in response to the test instruction; and
issuing a disconnect instruction to disconnect the second circuit when the datum indicates that the second circuit is not operational.

3. A method, comprising:
retrieving a first data set from a billing system configured to facilitate a billing operation associated with a network, the first data set including a plurality of billing records, each billing record from the plurality of billing records being associated with a circuit from a plurality of circuits included within the network, the plurality of billing records including a first billing record associated with a first circuit from the plurality of circuits;
retrieving a second data set from a configuration management system configured to facilitate an operation associated with the network, the second data set including a plurality of configuration records, each configuration record from the plurality of configuration records being associated with a circuit from the plurality of circuits, wherein the plurality of configuration records includes a first configuration record associated with a second circuit from the plurality of circuits;
determining, via a processor, whether the first billing record is associated with a legitimate order for service when the second data set does not include a configuration record from the plurality of configuration records that is associated with the first circuit;
issuing a provisioning instruction when the first billing record is associated with the legitimate order for service;
issuing a test instruction to test a portion of the network associated with the second circuit when the first data set does not include a billing record from the plurality of billing records that is associated with the second circuit;

receiving a datum in response to the test instruction; and issuing a billing instruction to establish a billing record in the first data set when the datum indicates that the second circuit is operational, the billing record being associated with the second circuit.

4. A method, comprising:

retrieving a first data set from a billing system configured to facilitate a billing operation associated with a network, the first data set including a plurality of billing records, each billing record from the plurality of billing records being associated with a circuit from a plurality of circuits included within the network;

retrieving a second data set from a configuration management system configured to facilitate an operation associated with the network, the second data set including a plurality of configuration records, each configuration record from the plurality of configuration records being associated with a circuit from the plurality of circuits, the plurality of configuration records including a first configuration record associated with a first circuit from the plurality of circuits;

issuing, via a processor, a test instruction to test a portion of the network associated with the first circuit when the first data set does not include a billing record from the plurality of billing records that is associated with the first circuit;

receiving a datum in response to the test instruction; and issuing a disconnect instruction to disconnect the first circuit when the datum indicates that the first circuit is not operational.

5. The method of claim 4, further comprising issuing a billing instruction to establish a billing record associated with the first circuit in the first data set when the datum indicates that the first circuit is operational.

6. The method of claim 4, further comprising producing a report when the first data set does not include a billing record from the plurality of billing records that is associated with the first circuit.

7. The method of claim 4, further comprising producing automatically a report when the first data set does not include a billing record from the plurality of billing records that is associated with the first circuit, the report including an identifier associated with the first circuit and a status of the first circuit.

8. The method of claim 4, wherein the plurality of billing records includes a first billing record associated with a second circuit from the plurality of circuits, the method further comprising:

determining whether the first billing record is associated with a legitimate order for service when the second data set does not include a configuration record from the plurality of configuration records that is associated with the second circuit; and issuing a provisioning instruction when the first billing record is associated with the legitimate order for service.

9. The method of claim 4, wherein the plurality of billing records includes a first billing record associated with a second circuit from the plurality of circuits, the method further comprising:

determining whether the first billing record is associated with a legitimate order for service when the second data set does not include a configuration record from the plurality of configuration records that is associated with the second circuit; and removing the first billing record from the first data set when the first billing record is not associated with the legitimate order for service.

* * * * *